(12) United States Patent
Tracy

(10) Patent No.: US 10,715,895 B2
(45) Date of Patent: Jul. 14, 2020

(54) LOUDSPEAKER SYSTEM

(71) Applicant: Dennis A. Tracy, Culver City, CA (US)

(72) Inventor: Dennis A. Tracy, Culver City, CA (US)

(*) Notice: Subject to any disclaimer, the term of this patent is extended or adjusted under 35 U.S.C. 154(b) by 0 days.

(21) Appl. No.: 15/958,264

(22) Filed: Apr. 20, 2018

(65) Prior Publication Data

US 2018/0310086 A1    Oct. 25, 2018

Related U.S. Application Data

(60) Provisional application No. 62/487,789, filed on Apr. 20, 2017.

(51) Int. Cl.
| | |
|---|---|
| *H04R 1/02* | (2006.01) |
| *B64D 11/06* | (2006.01) |
| *B64D 11/00* | (2006.01) |
| *H04R 1/28* | (2006.01) |
| *A47C 1/024* | (2006.01) |
| *A47C 7/72* | (2006.01) |

(52) U.S. Cl.
CPC ............ *H04R 1/025* (2013.01); *A47C 1/0242* (2013.01); *A47C 7/723* (2018.08); *A47C 7/727* (2018.08); *B64D 11/00154* (2014.12); *B64D 11/06* (2013.01); *H04R 1/2803* (2013.01); *H04R 2201/401* (2013.01)

(58) Field of Classification Search
CPC ....... A47C 1/723; A47C 1/727; A47C 1/0242; H04R 1/028; H04R 1/2803; H04R 2201/401; H04R 5/023; H04R 2499/13; B64D 11/06; B64D 11/00154; B64D 11/00155; B64D 11/0217; B60R 11/0217; B60N 2/879
See application file for complete search history.

(56) References Cited

U.S. PATENT DOCUMENTS

| | | | |
|---|---|---|---|
| 3,512,605 A | 5/1970 | McCorkle | |
| 3,870,834 A | 3/1975 | Yeaple | |
| 3,944,020 A | 3/1976 | Brown | |
| 4,042,791 A | 8/1977 | Wiseman | |
| 4,440,443 A * | 4/1984 | Nordskog | A47C 7/38 297/397 |
| 4,516,656 A | 5/1985 | Fleshier | |
| 4,696,370 A | 9/1987 | Tokumo et al. | |

(Continued)

FOREIGN PATENT DOCUMENTS

EP        1083094 A1 *   3/2001

*Primary Examiner* — Andrew C Flanders
(74) *Attorney, Agent, or Firm* — Welsh Flaxman & Gitler LLC

(57) ABSTRACT

A loudspeaker system for integration with a seat includes a first support arm and a second support arm. The first support arm extends from a first side of the support housing and supports a first loudspeaker driver assembly, and the second support arm extends from a second side of the support housing and supports a second loudspeaker driver assembly. The first loudspeaker driver assembly includes a central housing with a first array of drivers, and the second loudspeaker driver assembly includes a central housing with a second array of drivers. A retraction control mechanism moves the first support arm and the second support arm between the stowed orientation and the deployed orientation.

20 Claims, 12 Drawing Sheets

(56) References Cited

U.S. PATENT DOCUMENTS

| | | |
|---|---|---|
| 4,991,222 A | 2/1991 | Nixdorf |
| 5,143,055 A | 9/1992 | Eakin |
| 5,321,760 A * | 6/1994 | Gray .................. B60R 11/0217 |
| | | 181/150 |
| 5,591,946 A | 1/1997 | Jehle et al. |
| 5,784,473 A | 7/1998 | Ferren |
| 5,795,018 A * | 8/1998 | Schumacher ...... B64D 11/0015 |
| | | 244/118.5 |
| 5,838,808 A | 11/1998 | Prosser |
| 5,887,071 A | 3/1999 | House |
| 5,997,091 A | 12/1999 | Rech et al. |
| 6,120,099 A | 9/2000 | Reikeras et al. |
| 6,181,550 B1 | 1/2001 | Kim |
| 6,234,446 B1 * | 5/2001 | Patterson ........... B64D 11/0015 |
| | | 224/201 |
| 6,669,141 B2 | 12/2003 | Schmidt-Schaeffer |
| 6,744,898 B1 | 6/2004 | Hirano |
| 6,991,289 B2 | 1/2006 | House |
| 7,424,127 B1 | 9/2008 | Holmi et al. |
| 7,466,832 B2 | 12/2008 | House |
| 7,684,577 B2 | 3/2010 | Arai et al. |
| 7,753,163 B2 | 7/2010 | Bouchard |
| 8,045,743 B2 | 10/2011 | Aylward et al. |
| 8,160,267 B2 | 4/2012 | Sakamoto |
| 8,194,898 B2 | 6/2012 | Yokota |
| 8,221,246 B2 | 7/2012 | Lee et al. |
| 8,295,535 B2 | 10/2012 | Tracy |
| 8,325,936 B2 | 12/2012 | Eichfeld et al. |
| 8,419,124 B2 | 4/2013 | Kramer et al. |
| 8,565,442 B2 | 10/2013 | Maeda et al. |
| 8,577,073 B2 | 11/2013 | Tracy |
| 8,724,827 B2 | 5/2014 | Hartung et al. |
| 8,777,313 B2 | 7/2014 | Butt et al. |
| 9,090,332 B2 | 7/2015 | Asao et al. |
| 9,100,749 B2 | 8/2015 | Hartung et al. |
| 9,232,313 B2 | 1/2016 | Tracy |
| 9,420,361 B2 | 8/2016 | Tracy |
| 9,950,793 B2 | 4/2018 | Tracy |
| 9,955,890 B2 | 5/2018 | Indla et al. |
| 10,239,432 B2 * | 3/2019 | Subat .................. B60N 2/879 |
| 10,252,657 B2 * | 4/2019 | Lessard ............... B60N 2/885 |
| 2002/0076059 A1 | 6/2002 | Joynes |
| 2003/0142842 A1 | 7/2003 | Arai et al. |
| 2004/0021350 A1 * | 2/2004 | House .................... A47C 7/72 |
| | | 297/217.4 |
| 2005/0190935 A1 * | 9/2005 | Sakamoto ............ H04R 5/02 |
| | | 381/302 |
| 2009/0154737 A1 * | 6/2009 | Ostler ..................... A47C 7/72 |
| | | 381/301 |
| 2014/0219492 A1 | 8/2014 | Pelliccio et al. |
| 2014/0284976 A1 | 9/2014 | Riedel et al. |
| 2014/0334638 A1 * | 11/2014 | Barksdale .............. H04R 3/12 |
| | | 381/86 |
| 2015/0117668 A1 * | 4/2015 | Niss ...................... H04R 5/023 |
| | | 381/86 |
| 2015/0343961 A1 * | 12/2015 | Yu ...................... B60R 11/0217 |
| | | 381/389 |
| 2016/0023763 A1 | 1/2016 | Tracy |
| 2016/0068112 A1 * | 3/2016 | Price .................. B60R 11/0217 |
| | | 381/86 |
| 2016/0100250 A1 * | 4/2016 | Baskin ................... H04R 1/02 |
| | | 297/217.4 |
| 2017/0267138 A1 * | 9/2017 | Subat .................. B60N 2/879 |
| 2019/0106039 A1 * | 4/2019 | Winton ................ B60N 2/879 |

\* cited by examiner

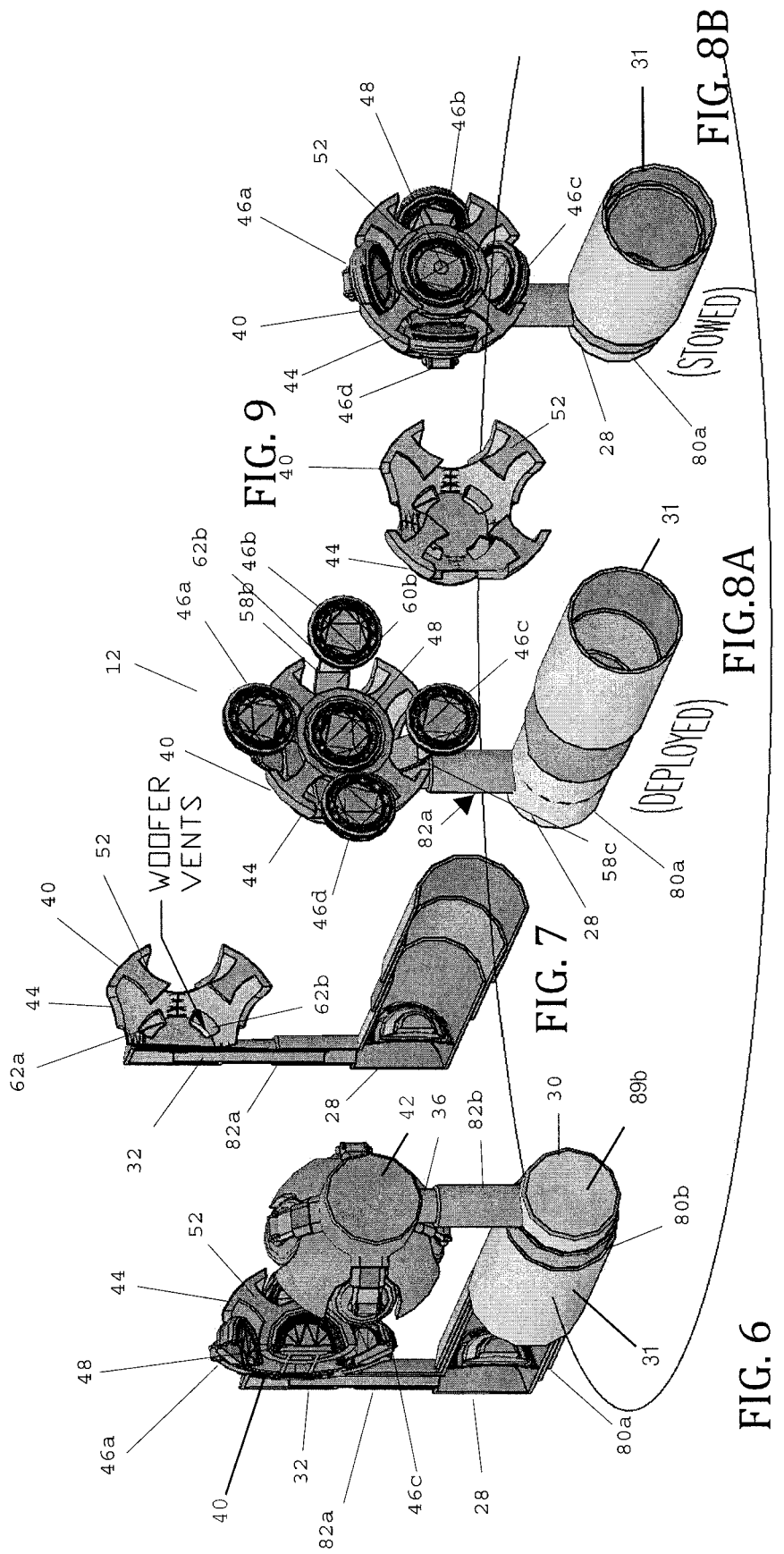

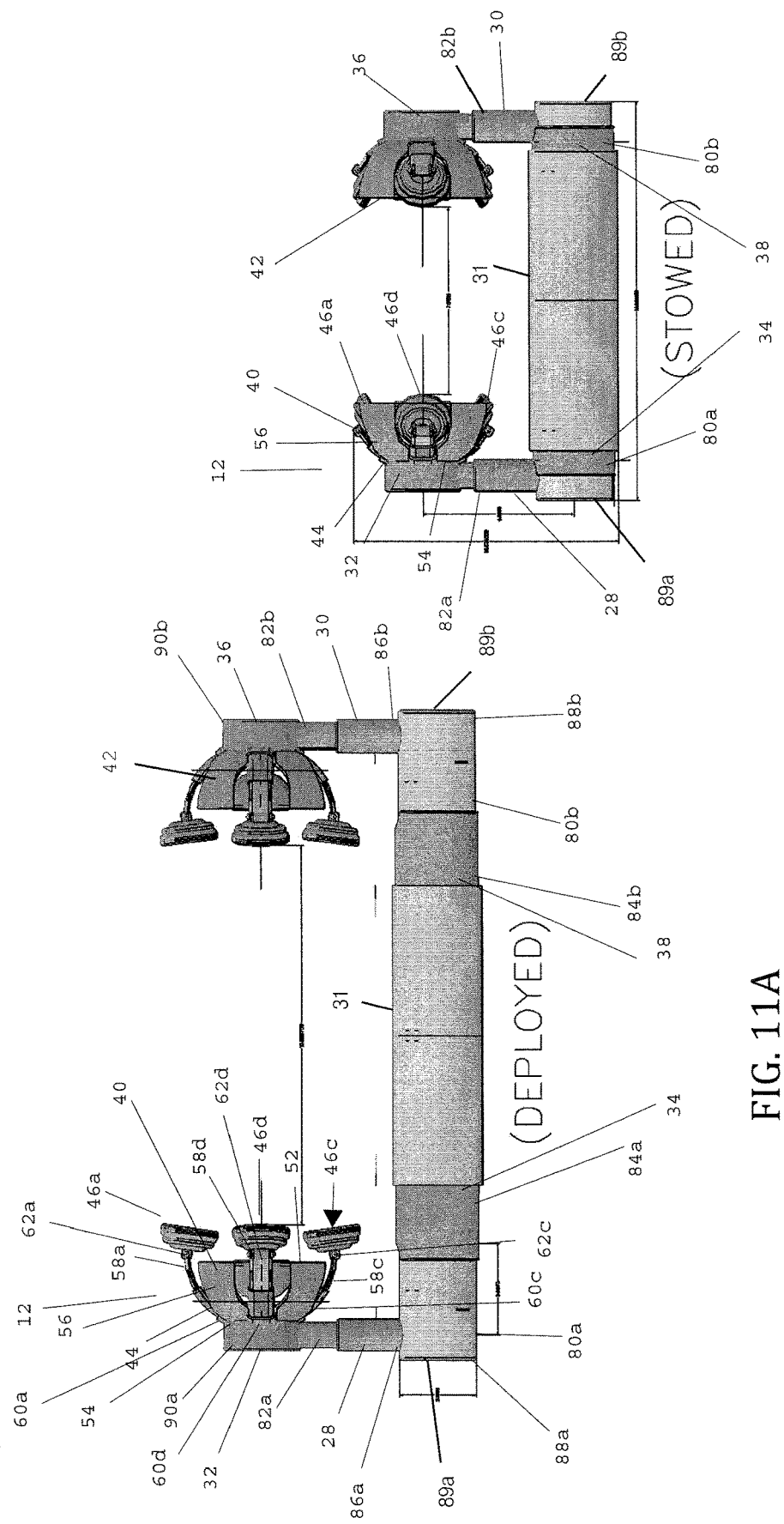
FIG. 11B (STOWED)
FIG. 11A (DEPLOYED)

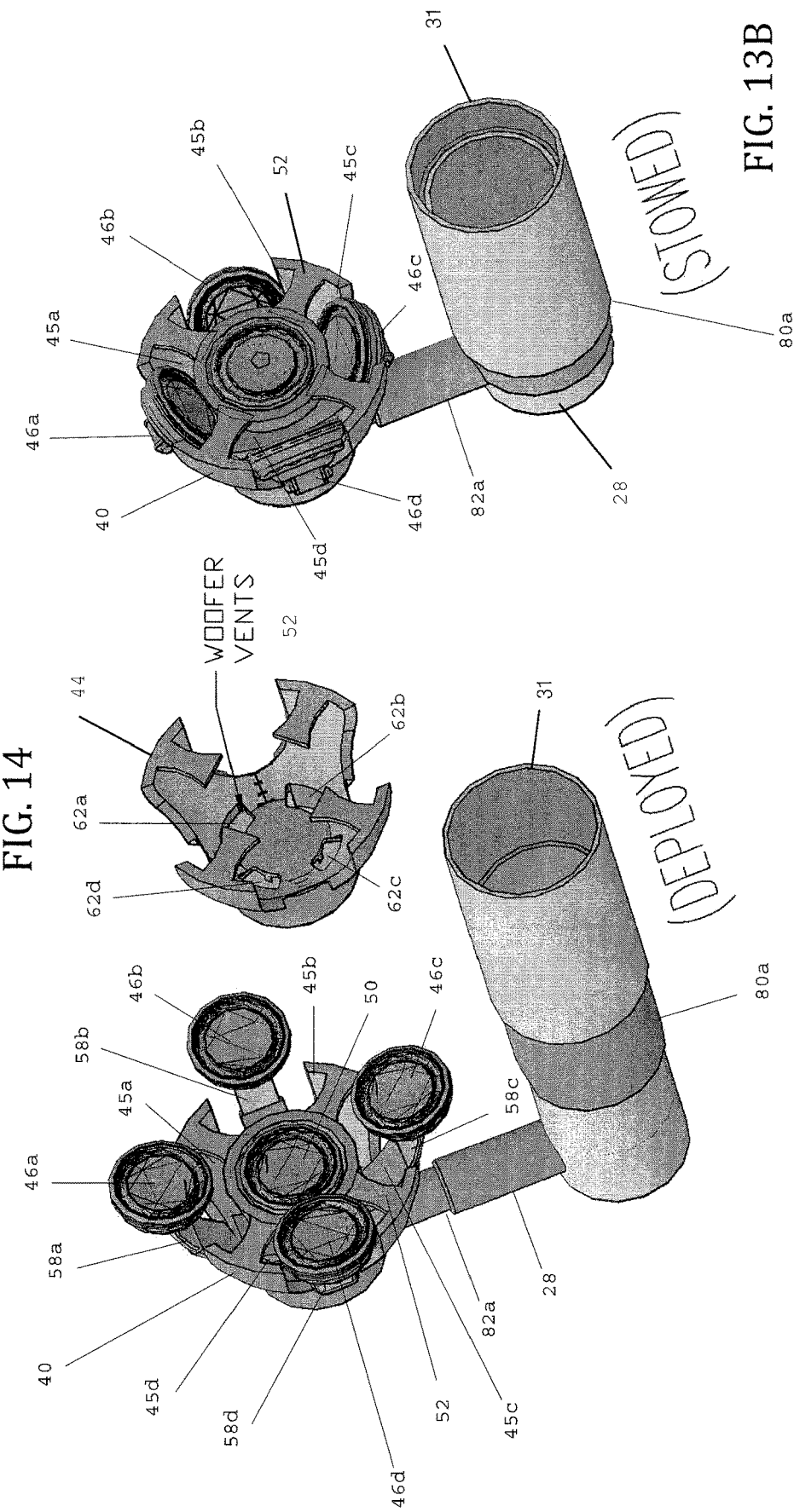

LOUDSPEAKER SYSTEM

CROSS REFERENCE TO RELATED APPLICATION

This application claims the benefit of U.S. Provisional Patent Application Ser. No. 62/487,789, entitled "LOUDSPEAKER SYSTEM," filed Apr. 20, 2017.

BACKGROUND OF THE INVENTION

1. Field of the Invention

The invention relates to a loudspeaker system. More particularly, the invention relates to a loudspeaker system integrated into a seat, for example, an aircraft seat, for providing a passenger with high quality sound without disturbing those sitting on nearby seats.

2. Description of the Related Art

The current global community has made it possible for people all around the country, and around the world, to interact for both business and personal reasons. For many people, this requires they spend considerable time traveling from one location to another location. More often than not, these people travel in aircraft. Whether these people travel in private or commercial aircraft, they desire high quality entertainment during the many hours they spend within the confines of an aircraft. However, while high quality entertainment, for example, digital video with CD quality sound, is readily available for theater and home use, the weight and size requirements for use in aircrafts make it very difficult to incorporate high fidelity systems within an aircraft. This problem is especially pronounced for audio loudspeaker assemblies when one attempts to meet the size, weight and shape requirements for use in aircrafts.

In the aircraft industry, great priority is placed upon component weight and size reduction. In addition, spacing and positioning of the loudspeaker assemblies is a great priority to those optimizing the operation of aircraft. The size, weight and shape of conventional terrestrial loudspeaker assembly designs adversely affect range and payload. These concerns are notable when one attempts to make changes within smaller, private jets. In addition, the limited space available within an aircraft dictates the use of any space within the aircraft be carefully considered by those responsible for ensuring the comfort of passengers.

Lightweight and compact audio loudspeakers are currently available. These loudspeakers, however, substantially compromise sound quality for reductions in size and weight. An individual wishing to add an audio system to an aircraft must make a choice between high fidelity loudspeakers not suiting the size and weight requirements of the aircraft and lower quality loudspeakers providing desirable size and weight characteristics.

Recently, aircrafts have added "suite" options for international travelers. These "suites" offer passengers a higher level of privacy and service. One feature of these suites is private video monitors for each suite. While passengers may use headphones in conjunction with the video monitors, most people find headphones to be somewhat inconvenient when worn for long periods of time and would prefer to use ambient sound sources while watching a movie or listening to audio while aboard an aircraft.

A need, therefore, exists for a loudspeaker system providing high fidelity sound, while meeting the size, weight and convenience requirements for use within an aircraft. The present invention provides such a loudspeaker assembly.

SUMMARY OF THE INVENTION

It is, therefore, an object of the present invention to provide a loudspeaker system for integration with a seat including a seat body having a horizontally oriented seat bottom and a seat back secured thereto. The seat back includes an upper end and a lower end, the lower end being positioned adjacent the seat bottom. The loudspeaker system includes a sound assembly shaped and dimensioned for mounting with the seat for selective movement between a stowed orientation in which the sound assembly is housed and hidden within a support housing mounted along the seat and a deployed orientation extending from the support housing in which the sound assembly is positioned for use. The sound assembly includes a first support arm and a second support arm. The first support arm extends from a first side of the support housing and supports a first loudspeaker driver assembly, and the second support arm extends from a second side of the support housing and supports a second loudspeaker driver assembly. The first loudspeaker driver assembly includes a central housing with a first array of drivers, and the second loudspeaker driver assembly includes a central housing with a second array of drivers. A retraction control mechanism moves the first support arm and the second support arm between the stowed orientation and the deployed orientation.

It is also an object of the present invention to provide a loudspeaker system wherein the first array of drivers includes a plurality of drivers selectively extending from the central housing of the first loudspeaker assembly, and the second array of drivers includes a plurality of drivers selectively radially extending from the central housing of the second loudspeaker assembly.

It is another object of the present invention to provide a loudspeaker system wherein the first array of drivers further includes a driver positioned along a front wall of the central housing of the first loudspeaker driver assembly, and the second array of drivers includes a driver positioned along a front wall of the central housing of the second loudspeaker driver assembly.

It is a further object of the present invention to provide a loudspeaker system wherein the central housing of the first loudspeaker driver assembly includes a front wall, a rear wall and a side wall extending between the rear wall and the front wall. Driver support members are secured to the central housing in a spaced arrangement, wherein the plurality of drivers of the first loudspeaker driver assembly is respectively secured to the driver support members.

It is also an object of the present invention to provide a loudspeaker system wherein the central housing of the second loudspeaker driver assembly includes a front wall, a rear wall and a side wall extending between the rear wall and the front wall. Driver support members are secured to the central housing in a spaced arrangement, wherein the plurality of drivers of the second loudspeaker driver assembly is respectively secured to the driver support members.

It is another object of the present invention to provide a loudspeaker system wherein each of the driver support members of the first and second loudspeaker driver assemblies is provided with a servo-motor for controlling selective extension of the driver support members.

It is a further object of the present invention to provide a loudspeaker system wherein the first support arm is hollow and the second support arm is hollow.

It is also an object of the present invention to provide a loudspeaker system wherein the first support arm is L-shaped to wrap about one side of a passenger sitting on the seat and the second support arm is L-shaped shaped to wrap about an opposite side of a passenger sitting on the seat.

It is a further object of the present invention to provide a loudspeaker system further including a nondirectional sound assembly.

It is also an object of the present invention to provide a loudspeaker system wherein the nondirectional sound assembly includes a first low frequency driver positioned within the first support arm and a second low frequency driver positioned within the second support arm.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 6 is a partial cross sectional perspective view of the loudspeaker system in its stowed configuration.

FIG. 7 is a cross sectional perspective view of the loudspeaker system with the drivers and caps of the first end of the long telescoping first arm member removed.

FIGS. 8A and 8B are respectively perspective views of the loudspeaker system in its deployed and stowed configurations, wherein the caps of the first end of the long telescoping first arm member are removed. These views show the first hollow support arm and first loudspeaker driver assembly in its stowed and deployed configurations, wherein the second hollow support arm and second loudspeaker driver assembly are identical.

FIG. 9 is a detailed perspective view of the central housing of the first loudspeaker driver assembly with the drivers and support members removed.

FIGS. 11A and 11B are respectively side rendered views of the loudspeaker system in its deployed and stowed configurations.

FIGS. 13A and 13B are respectively detailed perspective rendered views of the loudspeaker system in its deployed and stowed configurations, wherein the caps of the first end of the long telescoping first arm member are removed. These views show the first hollow support arm and first loudspeaker driver assembly in its stowed and deployed configurations, wherein the second hollow support arm and second loudspeaker driver assembly are identical.

FIG. 14 is another detailed perspective view of the central housing of the first loudspeaker driver assembly with the drivers and support members removed, wherein the second loudspeaker driver assembly is identical.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

Figure 1:
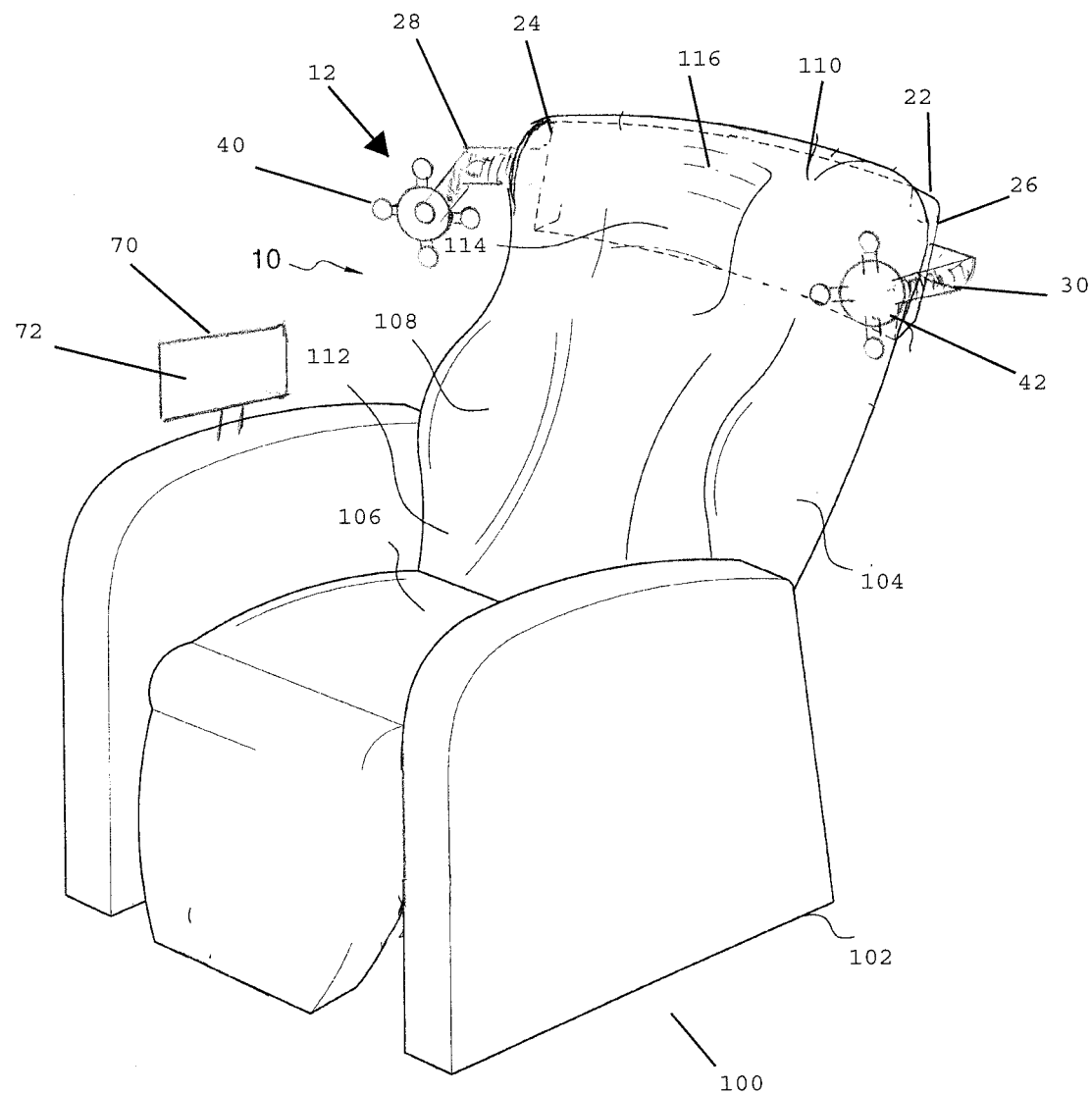
FIG. 1 is a perspective view of an aircraft seat in accordance with a first embodiment of the present invention and with the loudspeaker system in its extended, deployed orientation.
Figure 2:
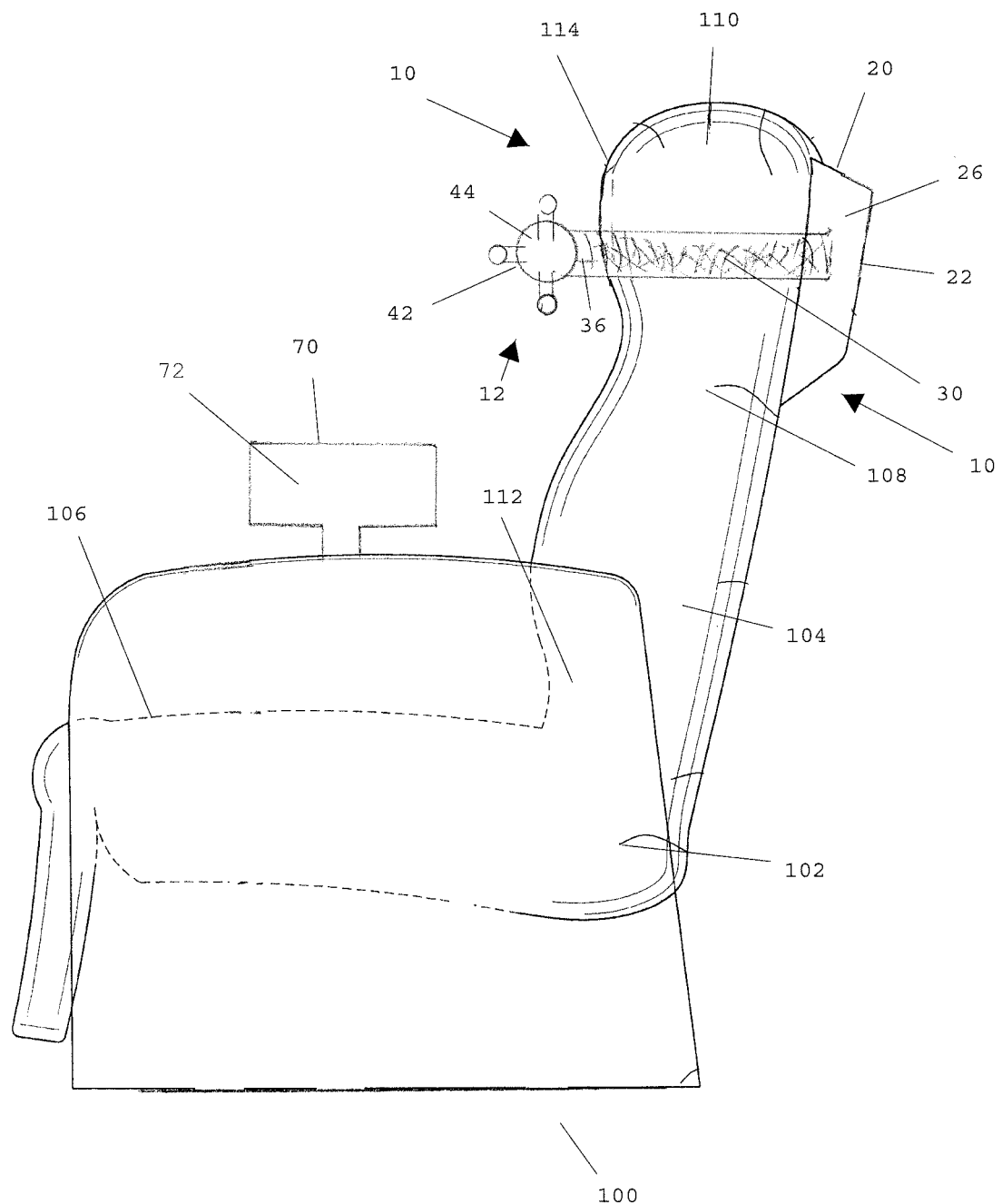
FIG. 2 is a side view of the aircraft seat shown with reference to FIG. 1.
Figure 3:
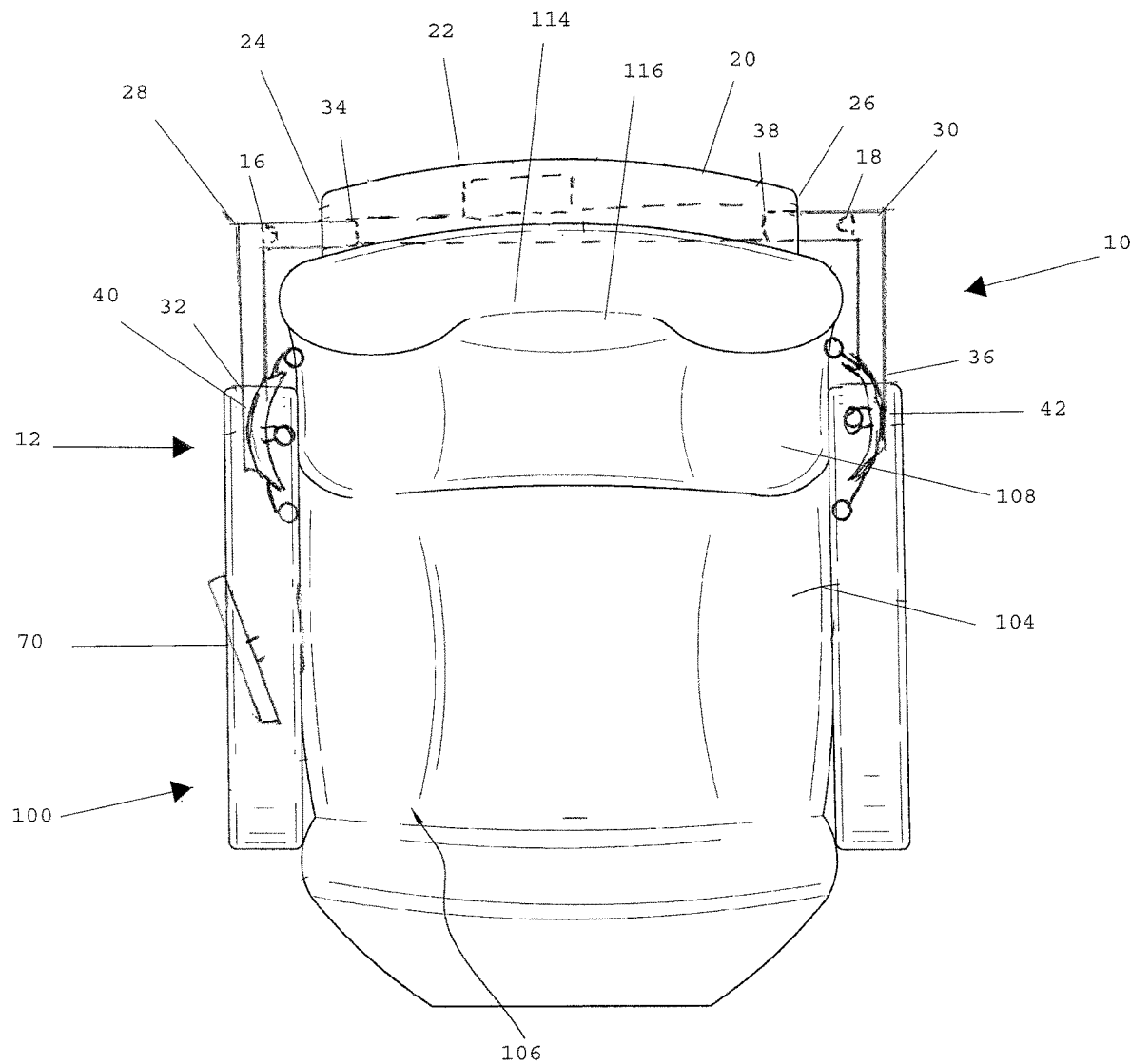
FIG. 3 is a top view of the aircraft seat shown with reference to FIG. 1.
Figure 4:
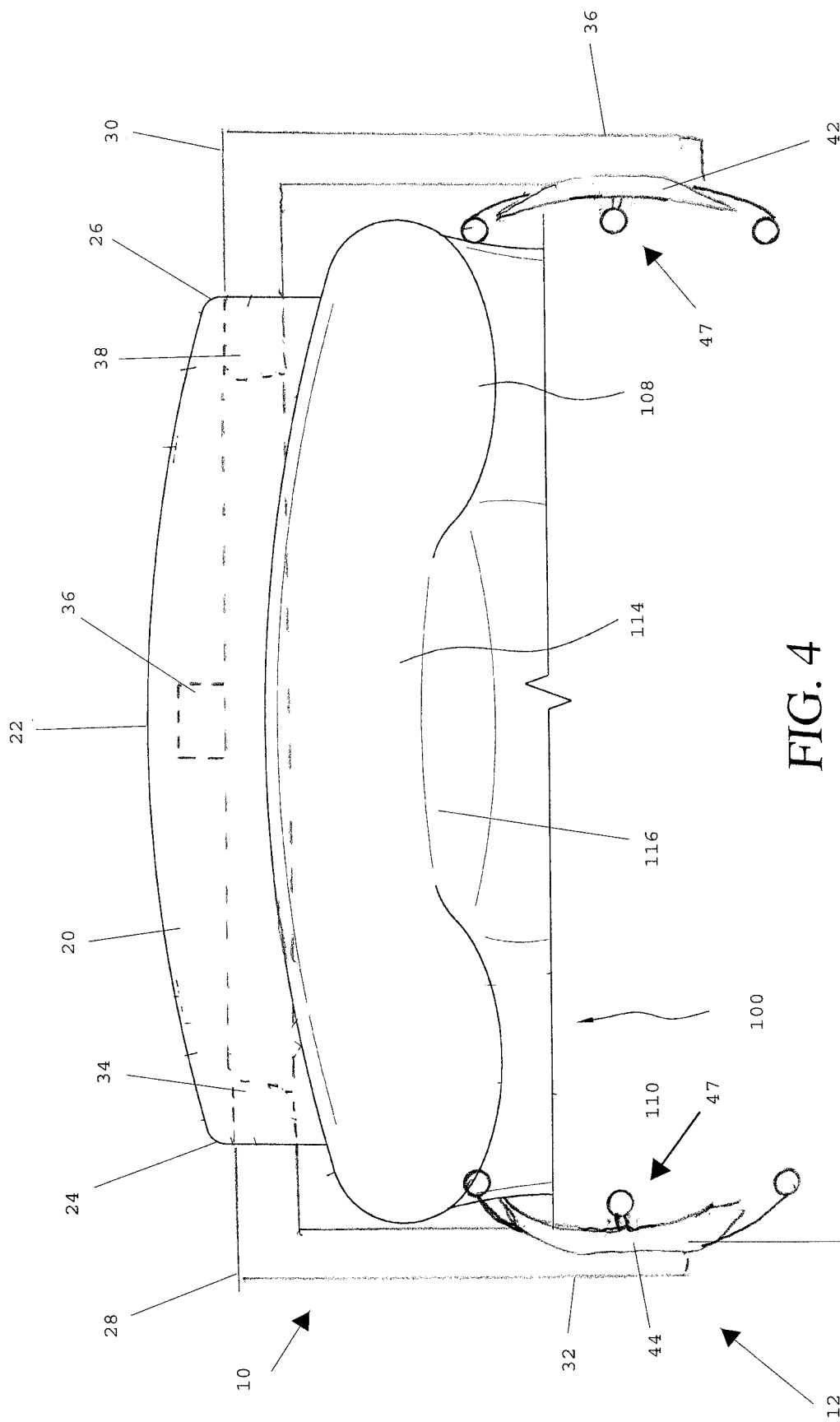
FIG. 4 is a detailed top view showing the loudspeaker system in its extended, deployed orientation.
Figure 5:
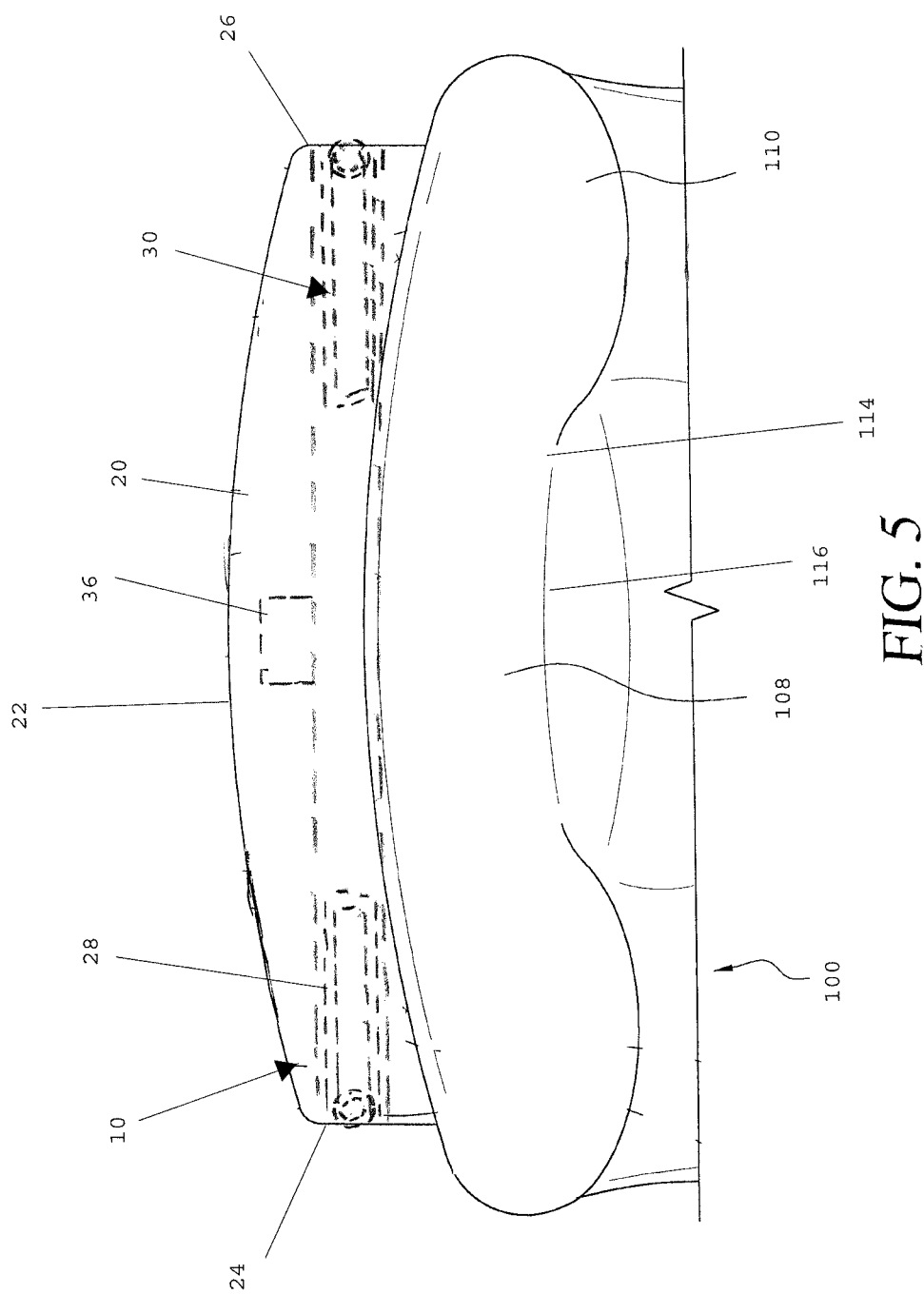
FIG. 5 is a detailed top view showing the loudspeaker system in its retracted, stowed orientation.
Figures 10A, 10B:
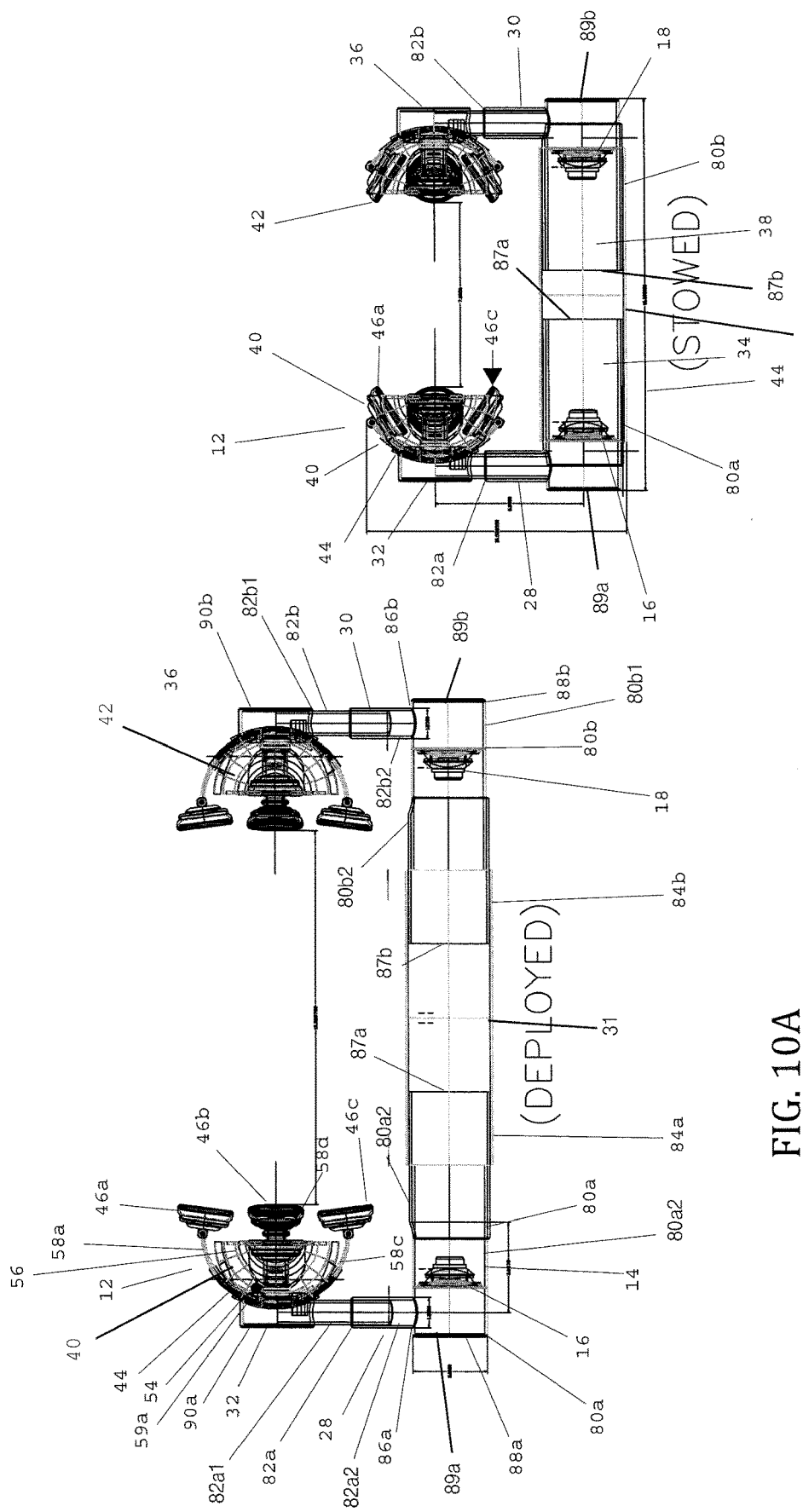
FIGS. 10A and 10B are respectively side line views of the loudspeaker system in its deployed and stowed configurations.
Figures 12A, 12B:
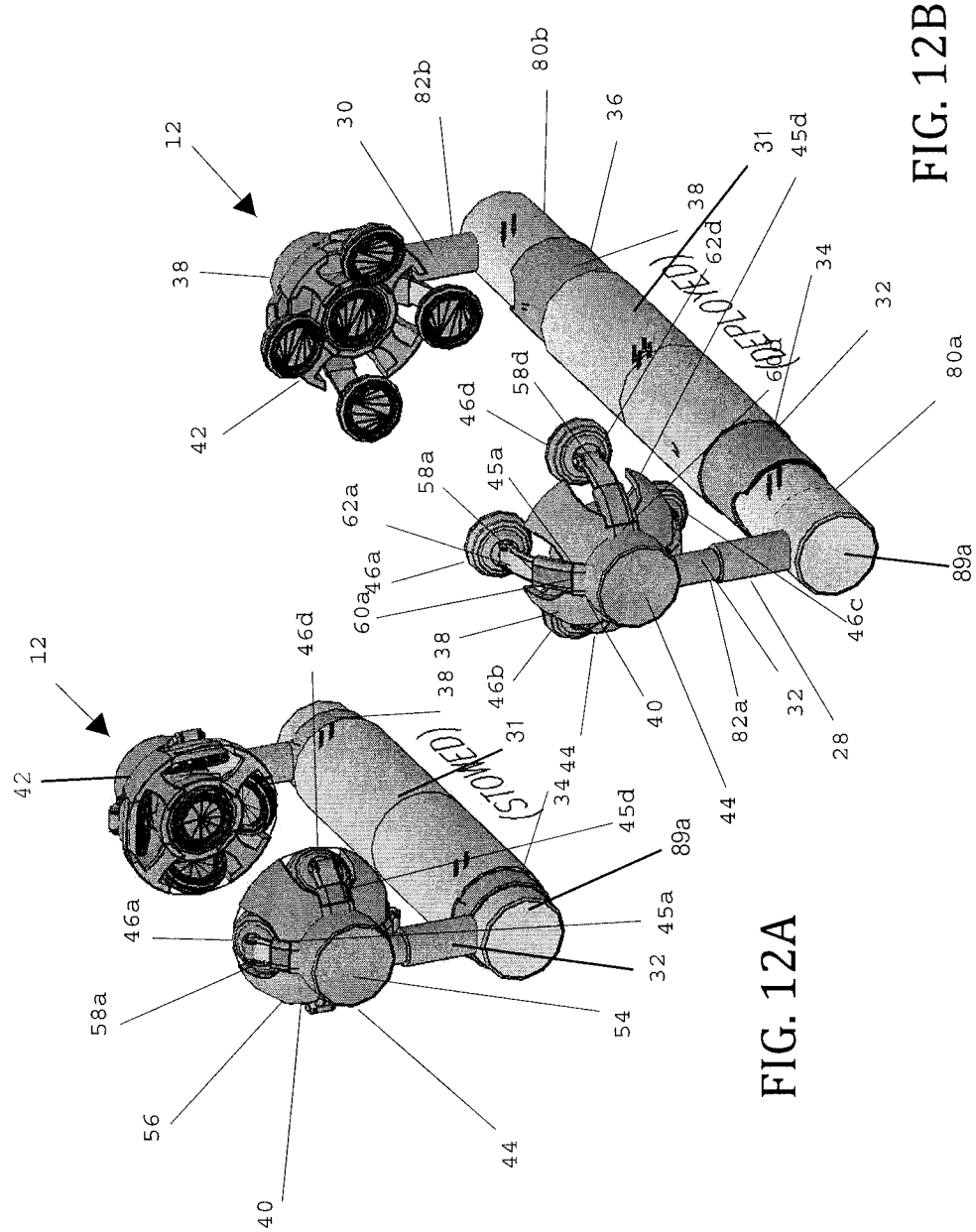
FIGS. 12A and 12B are respectively perspective rendered views of the loudspeaker system in its stowed and deployed configurations.
Figures 15A, 15B:
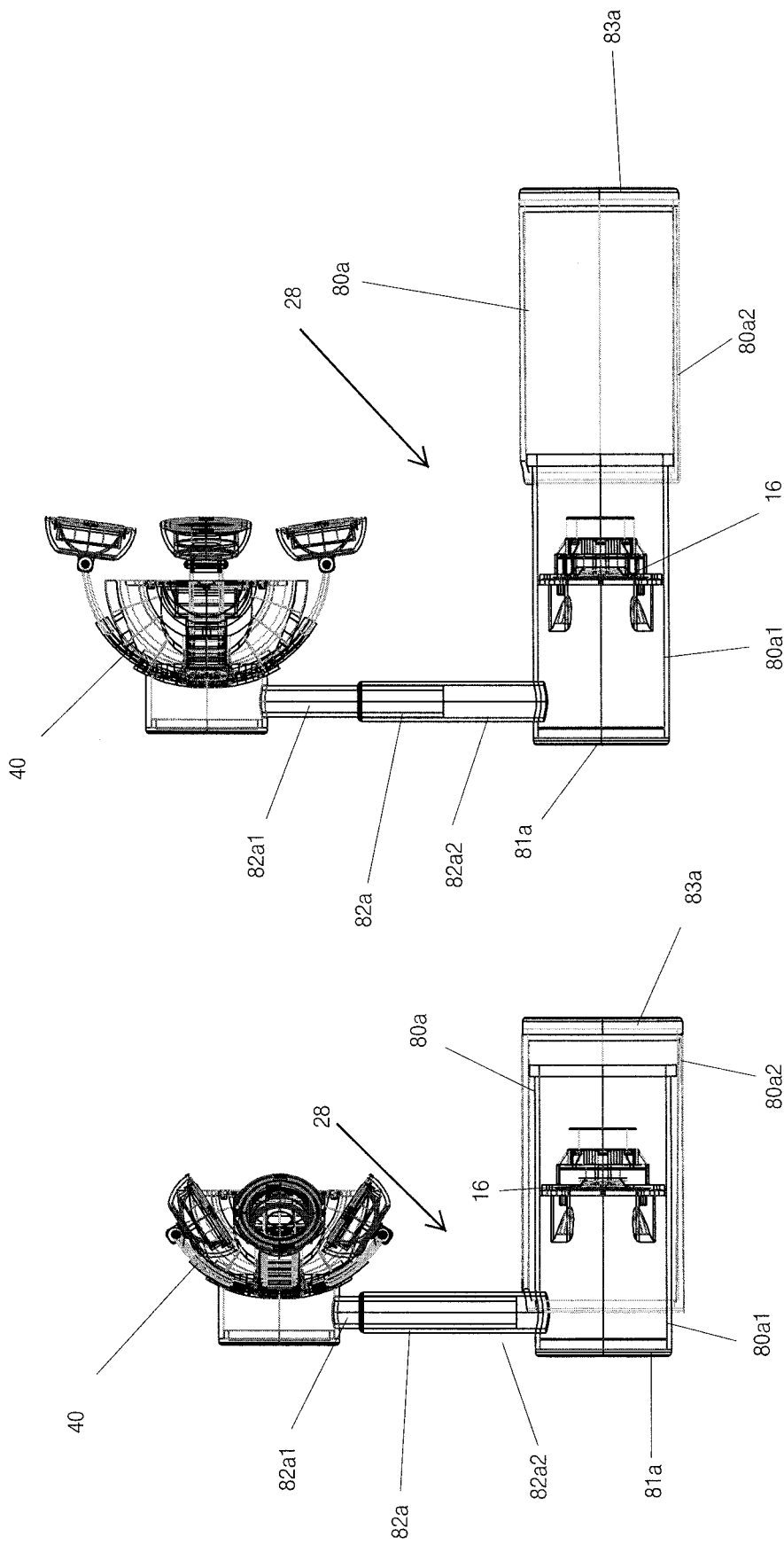
FIGS. 15A and 15B are respectively detailed sectional views of the first hollow support arm and first loudspeaker driver assembly in its stowed and deployed configurations, wherein the second hollow support arm and second loudspeaker driver assembly are identical.
Figure 16:
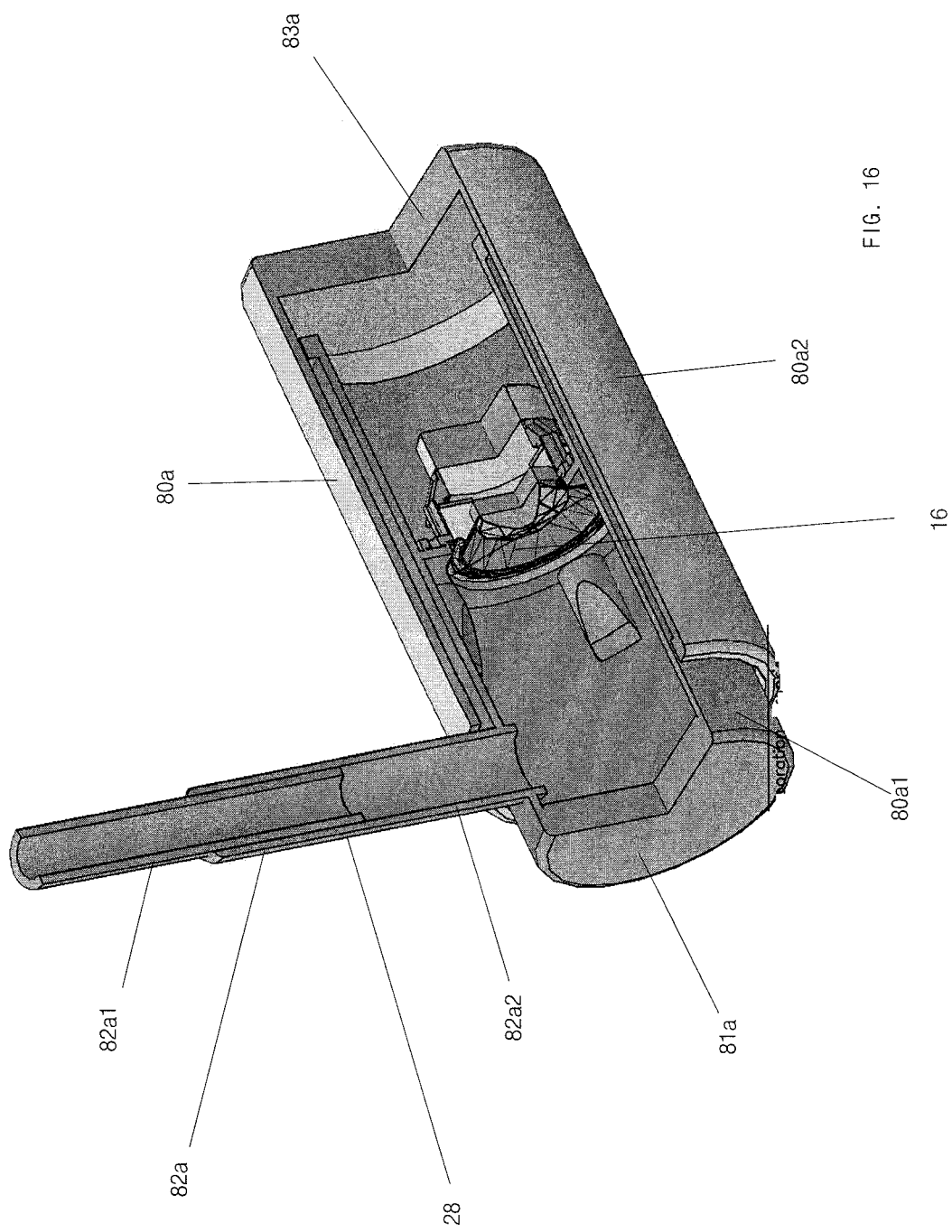
FIG. 16 is a partial cross sectional view of the first hollow support arm in its stowed configuration, wherein the second hollow support arm and second loudspeaker driver assembly are identical.

In accordance with the present invention, and with reference to FIGS. 1 to 16, a loudspeaker system 10 integrated into an aircraft seat 100 is disclosed. The present aircraft seat 100 with an integrated loudspeaker system 10 creates an isolated sound stage designed to prevent egress from one aircraft seating area to another aircraft seating area. As will be appreciated based upon the following disclosure, the loudspeaker system 10 creates a full-range audio reproduction of a three dimensional sound field through the utilization of an array of specifically oriented loudspeaker drivers, in conjunction with a digital signal processor and associate media source. By isolating one seating area from another seating area passengers are inclined to not use headphones, providing passengers with an alternative to headphones when enduring long flights. The present loudspeaker system 10 is particularly adapted for use in aircraft first class "suites". These suites occupy a limited space, but provide passengers with a high level of privacy and comfort. In addition, and as will be appreciated based upon the following disclosure, the ability to selectively deploy and stow the loudspeaker system importantly allows the driver array assemblies to be stowed for takeoff and landing.

The aircraft seat 100 is a conventional aircraft seat that is used in first or business class, and includes a base support structure 102 upon which a seat body 104 is mounted. The seat body 104 includes a horizontally oriented seat bottom 106 and a seat back 108 secured thereto for supporting the back of a passenger sitting on the aircraft seat 100. Those skilled in the art will appreciate the seat back 108 is preferably pivotally secured to the seat bottom 106 and may, therefore, change its angular orientation relative to the seat bottom 106 at the discretion of the passenger. In fact, many aircraft now offer seats with seat backs that may be pivoted between an upright sitting position with the seat back substantially vertically oriented and a lying position with the seat back substantially horizontally oriented. The present invention should not be construed as being limited to the specifics of the seat itself, as the present loudspeaker system may be implemented in a variety of aircraft seat constructions without departing from the spirit of the present invention.

In addition, although the present loudspeaker system 10 is disclosed herein as being employed within an aircraft seat, it is contemplated the principles of the present invention may be employed in a variety of seating types and structures.

The seat back 108 includes an upper end 110 and a lower end 112. The lower end 112 is positioned adjacent the seat bottom 106 for supporting the lower back portion of the passenger, while the upper end 110 of the seat back 108 includes a forward facing headrest structure 114 for supporting the head and upper back of the passenger as he or she sits within the aircraft seat 100. In particular, and in accordance with a preferred embodiment of the present invention, the headrest structure 114 includes an ergonomically formed head support portion 116 specifically designed to support the passenger's head in a comfortable and stable manner.

Although a seat back with an integrally formed headrest structure is disclosed in accordance with a preferred embodiment of the present invention, and is commonly employed in the aircraft industry for the design of the seat backs, it is contemplated the headrest structure may be a separate structure selectively secured to the remainder of the seat back for forming a complete seat structure in accordance with the present invention.

The loudspeaker system 10 specifically includes a directional sound assembly 12 and a nondirectional sound assembly 14. Both the directional sound assembly 12 and the nondirectional sound assembly 14 are integrated with the headrest structure 114. It is, however, appreciated that some seats separate the headrest from the shoulder area of the seat, and the present loudspeaker system could certainly be integrated into the shoulder area of the seat.

The nondirectional sound assembly 14 includes first and second low frequency drivers 16, 18 ported for transmitting the low frequency elements of a sound signal within the immediate proximity of the passenger as he or she sits on the aircraft seat 100. The nondirectional sound assembly 14 is provided with a conventional crossover circuit (not shown). While a conventional lowpass crossover is employed in accordance with a preferred embodiment of the present invention, it is appreciated analog or digital signal processing may be employed to derive the multiband crossovers required for the driver arrays and the low-frequency drivers of the present invention. In this way, the loudspeaker system 10 may be wired to a conventional receiver in much the same manner prior art subwoofer/satellites are wired. The use of a ported subwoofer arrangement (that is, nondirectional sound assembly) allows for the employment of small diameter drivers minimizing the space required for implementation of the present loudspeaker assembly 10.

The directional sound assembly 12 is mounted to the headrest structure 114 for selective extension to a deployed (or use) orientation (see FIGS. 1, 2, 3, 4, 8A, 10A, 11A, 12B, 13A, and 15B) by the passenger when he or she desires to listen to audio and/or watch video. In accordance with a preferred embodiment of the present invention, the directional sound assembly 12 is mounted for selective movement between a stowed (or storage) orientation (see FIGS. 5, 8B, 10B, 11B, 12A, 13B, 15A and 16) in which the directional sound assembly 12 is housed and hidden within a support assembly 20 mounted along the backside of the headrest structure 114 of the seat back 108 and a deployed (or use) orientation in which the directional sound assembly 12 is extended from the support assembly 20 mounted along the backside of the headrest structure 114 of the seat back 108 for positioning in a facing relationship with the head support portion 116 for use as described herein in greater detail. While the loudspeaker system of the present invention is disclosed herein as being secured along the backside of the seat, it is appreciated the loudspeaker system may be secured along the sides of the headrest's inboard and outboard sides (or at other locations determined to provided optimal sound reproduction in conjunction with the movement of the loudspeaker system between its deployed and stowed orientations).

As briefly discussed above, the nondirectional sound assembly 14 and the directional sound assembly 12 are supported by the headrest structure 114 of the seat back 108. In particular, the nondirectional and directional sound assemblies 14, 12 are supported by and housed in a support assembly 20 that is secured to the headrest structure 114 of the seat back 108. It is appreciated that the support assembly may be integrally formed with the headrest structure in which case the nondirectional and directional sound assemblies would be supported and housed solely by the headrest structure.

The support assembly 20 includes an elongated static central housing structure 22 that is secured to the backside of the headrest structure 114 of the seat back 108. The central housing structure 22 includes a first end 24 and a second end 26. The central housing structure also includes a central cylindrical housing 31 directly supporting the structural elements of the directional sound assembly 12 and the nondirectional sound assembly 14 as will be discussed below in greater detail below. A first hollow support arm 28 telescopically extends from the central cylindrical housing 31 at the first end 24 of the central housing structure 22 and a second hollow support arm 30 telescopically extends from the central cylindrical housing 31 at the second end 26 of the central housing structure 22. While a central housing structure is disclosed in accordance with a preferred embodiment, it is appreciated the loudspeaker system may be integrated with the seat back structure thereby obviating the need for a central housing structure.

The first and second hollow support arms 28, 30 are L-shaped so as to allow for extension in a manner positioning the second ends 34, 38 thereof adjacent the ears of a passenger. That is, the first hollow support arm 28 is shaped and dimensioned to extend from the first end 24 of the central housing structure 22 in a manner positioning the second end 34 of the first hollow support arm 28 to the left of the head support portion 116 so as to wrap about one side of the head of a passenger as he or she sits on the aircraft seat 100. Similarly, second hollow support arm 30 is shaped and dimensioned to extend from the second end 26 of the central housing structure 22 in a manner positioning the second end 38 of the second hollow support arm 30 to the right of the head support portion 116 so as to wrap about the other side of the head of a passenger as he or she sits on the aircraft seat 100.

Considering the L-shaped construction of the first and second hollow support arms 28, 30, each includes a long telescoping first arm member 80a, 80b (each composed of telescopically constructed first and second long arm members 80a1, 80a2, 80b1, 80b2) and a short telescoping second arm member 82a, 82b (each composed of telescopically constructed first and second short arm members 82a1, 82a2, 82b1, 82b2). The long telescoping first arm member 80a, 80b and the short telescoping second arm member 82a, 82b are oriented substantially perpendicular to each other. As will be appreciated, this construction allows the first and second hollow support arms 28, 30 to be moved between a deployed orientation and a stowed orientation in a highly efficient manner. As will be discussed below in greater detail, the long telescoping first arm member 80a, 80b may be extended from the central housing structure 22 and the short telescoping second arm member 82a, 82b may be extended and rotated for proper positioning adjacent a passenger's ears. The long telescoping first arm member 80a, 80b and the short telescoping second arm member 82a, 82b respectively include first ends 84a, 84b, 86a, 86b and second ends 88a, 88b, 90a, 90b wherein the first end 86a, 86b of the short telescoping second arm member 82a, 82b is connected to the second end 88a, 88b of the long telescoping first arm member 80a, 80b. The second end 90a, 90b of the short telescoping second arm member 82a, 82b corresponds to the free first end 32, 36 of the first and second hollow support arms 28, 30 and the first end 84a, 84b of the long telescoping first arm member 80a, 80b corresponds to the second end 34, 38 of the first and second hollow support arms 28, 30. The respective first ends 84a, 84b of the long telescoping first arm members 80a, 80b are telescopically housed within a central cylindrical housing 31 that is positioned within the central housing structure 22.

In accordance with a preferred embodiment, the respective first ends 84a, 84b of the long telescoping first arm members 80a, 80b are provided with removable caps 87a, 87b and the respective second ends 88a, 88b of the long telescoping first arm members 80a, 80b are provided with removable caps 89a, 89b. These removable caps 87a, 87b, 89a, 89b allow access to the internal structure of the first and second hollow support arms 28, 30 in the event repairs are required.

The second end 34 of the first hollow support arm 28 is coupled to the retraction control mechanism 36 of the support assembly 20, while the second end 38 of the second hollow support arm 30 is coupled to the retraction control mechanism 36 of the support assembly 20. The retraction control mechanism 36 retracts and extends, as well as rotates, the first and second support arms 28, 30, from the support housing structure 22, in particular, the central cylindrical housing 31, for proper positioning thereof within the limited space confines of an aircraft.

A first loudspeaker driver assembly 40 is secured to the first end 32 of the first hollow support arm 28 such that it faces a passenger sitting on the aircraft seat 100 when it is extended to its use orientation. Wiring (not shown) for transmission of sound signals to the first loudspeaker driver assembly 40 passes through a lumen formed in the first support arm 28.

A second loudspeaker driver assembly 42 is secured to the first end 36 of the second hollow support arm 30 such that it faces a passenger sitting on the aircraft seat 100 when it is extended to its use orientation. Wiring (not shown) for transmission of sound signals to the second loudspeaker driver assembly 42 passes through a lumen formed in the second support arm 30.

The first and second loudspeaker driver assemblies 40, 42 are identical. As such, only the first loudspeaker driver assembly 40 is described in detail below. The first loudspeaker driver assembly 40 includes a central housing 44 supporting an array 47 of drivers. In accordance with a preferred embodiment, the first loudspeaker driver assembly 40 includes four high-frequency/mid-range drivers 46a-d that selectively extend when the directional sound assembly 12 and first loudspeaker driver assembly 40 are in their deployed orientation. The first loudspeaker driver assembly 40 also includes a fifth high-frequency/mid-range driver 48 positioned along the front wall 52 of the central housing 44. It is appreciated the number and positioning of the various loudspeaker drivers may be adjusted so long as the loudspeaker driver assembly is capable of creating a quasi full-range audio reproduction of a fully three-dimensional sound field.

The central housing 44 has a substantially disc shaped construction and includes a front wall 52, a rear wall 54 and a side wall 56 extending between the rear wall 54 and the front wall 52. Four elongated driver support members 58a-d are secured to the side wall 56 in an equal spaced arrangement about the circumference of the central housing 44. Each of the first, second, third, and fourth driver support members 58a-d includes a first end 60a-d secured to the side wall 56 for movement relative thereto and a second end 62a-d to which one of the previously described first, second, third and fourth high-frequency/mid-range drivers 46a-d is secured. The outer profile of the central housing 44 is maintained relatively smooth by providing the central housing 44 with a plurality of recesses 45a-d in which the first, second, third, and fourth driver support members 58a-d are positioned and in which they move as they are actuated between their use orientation and their stowed orientation. Although a loudspeaker driver assembly with four retractable arms and drivers is disclosed herein, it is appreciated loudspeaker driver assemblies in accordance with the present invention may be constructed with only three retractable arms and drivers or it may be constructed with more than four retractable arms and drivers. It is further contemplated, the fifth high-frequency/mid-range driver may be removed and the sound signals being sent thereto (for example, center channel audio), may be sent to the other drivers.

Controlled movement of the first, second, third, and fourth driver support members 58a-d is achieved by providing each of the driver support members 58a-d with a servo-motor 59a (as shown in conjunction with the first driver support member 58a, although it is appreciated all of the driver support members include such a servo-motor) adjacent the pivotally mounted first end 60a-d such that the first, second, third, and fourth driver support members 58a-d can be selectively extended/retracted between a stowed orientation where the first, second, third, and fourth driver support members 58a-d are in close approximation with the side wall 56 and a deployed orientation where the first, second, third, and fourth driver support members 58a-d extend radially outwardly from the side wall 56.

Storage of the first, second, third, and fourth driver support members 58a-d within the side wall 56 is enhanced by constructing the first, second, third, and fourth driver support members 58a-d with an arcuate configuration matching the radius of curvature of the central housing 44 along its side wall 56 and positioning the first, second, third, and fourth driver support members 58a-d within the recesses 45a-d discussed above. As such and when the first, second, third, and fourth driver support members 58a-d are moved into close approximation with the side wall 56 they will substantially conform with the side wall 56. In fact, the recesses 45a-d are shaped and dimensioned to receive the respective first, second, third, and fourth driver support members 58a-d when the directional sound assembly 12 (and the loudspeaker driver assemblies 40, 42) are in its stowed orientation as shown in FIGS. 5, 8B, 10B, 11B, 12A, 13B, 15A, and 16.

As discussed above, a nondirectional sound assembly 14 is also integrated into the present speaker system 10. In particular, and as briefly discussed above, the nondirectional sound assembly 14 includes the first and second low-frequency drivers 16, 18. The first low-frequency driver 16 is secured within the long telescoping first support arm member 80a at a position adjacent the short telescoping second support arm member 82a; that is, the first low-frequency driver 16 is secured within the long telescoping first support arm member 80a at a position adjacent the second end 88a of the long telescoping first support arm member 80a. Similarly, the second low-frequency driver 18 is secured within the long telescoping first support arm member 80*b* at a position adjacent the short telescoping second support arm member 82*b*; that is, the second low-frequency driver 18 is secured within the long telescoping first support arm member 80*b* at a position adjacent the second end 88*b* of the long telescoping first support arm member 80*b*. As the long telescoping first and second support arm member 80*a*, 80*b* are extended from the central housing structure 22, additional space is created in and around the first and second low-frequency drivers 16, 18 in a manner enhancing the efficiency of the first and second low frequency drivers 16, 18. In particular, the additional space enhances both the amplitude and frequency response of the first and second low frequency drivers 16, 18. This results in lower compression/damping of the driver's cone during excursion and incursion. As a result, the telescoping structure of the present invention, when deployed, provides for an increase in the volume of space behind each of the first and second low-frequency drivers 16, 18, thus enhancing the efficiency of the bass reproduction.

As the first and second low-frequency drivers 16, 18 are housed within the respective first and second hollow support arms 28, 30, the sound generated thereby must be ported. This is achieved by providing the central housing 44 with ports 62*a-d* that are in communication with the interior of the respective first and second hollow support arms 28, 30. The ports 62*a-d* are opened when the driver support members 58*a-d* are extended in their use orientation.

As discussed above, the first and second hollow support arms 28, 30 move between a stowed orientation as shown with reference to FIGS. 5, 8B, 10B, 11B, 12A, 13B, 15A, and 16 and a use orientation as shown with reference to FIGS. 1-4, 8A, 10A, 11A, 12B, 13A, 15B and 16. This is achieved by extending and rotating the first and second hollow support arms 28, 30 in a synchronized manner such that they move from their storage position within the central housing structure 22 to positions adjacent the ears of the user. In particular, and considering the first and second hollow support arms 28, 30 within their stowed positions, that is, with the long telescoping first support arm members 80*a*, 80*b* and short telescoping second support arm members 82*a*, 82*b* of the respective first and second hollow support arms 28, 30 fully retracted within the central housing structure 22 and the second ends 34, 38 thereof directed upwardly within preformed recesses of the central housing structure 22. When it is time to use the present loudspeaker system 10, the retraction control mechanism 36 is actuated and the long telescoping first support arm members 80*a*, 80*b* of the first and second hollow support arms 28, 30 are extended outwardly from the central housing structure 22, followed by the short telescoping second support arm members 82*a*, 82*b* of the first and second hollow support arms 28, 30 extending outwardly.

As the first and second hollow support arms 28, 30 are extended outwardly, they are simultaneously rotated such that the free first ends 32, 36 thereof move from a position directed substantially upward to a position substantially located forward such that the first ends 32, 36, and the first and second loudspeaker driver assemblies 40, 42, are positioned adjacent the ears of the user. In conjunction with the movement of the first and second hollow support arms 28, 30, the first and second loudspeaker driver assemblies 40, 42 are also moved between their stowed orientation and their use orientation. That is, the first, second, third, and fourth driver support members 58*a-d* of the respective first and second loudspeaker assemblies 40, 42 are extended and the drivers secured thereto are rotated to a desired position.

Once it is no longer desired to use the loudspeaker system 10, the extension motion is reversed and the elements are retracted to their stowed orientation.

By providing a directional sound assembly 12 which directly transmits sound to the passenger sitting on a seat 100 and a nondirectional sound assembly 14 for transmission of low frequency sound to a passenger sitting on the aircraft seat 100, the present loudspeaker system 10 focuses sound directly upon the passenger sitting on the aircraft seat 100. However, it is important that, while the sound experience of the passenger employing the present loudspeaker system 10 be at the highest quality level possible, the experience of one passenger must not negatively affect those passengers sitting adjacent, or in a suite next to the passenger using the present loudspeaker system.

The present loudspeaker system employs a progressive compression system to minimize disturbance to adjacent passengers while maximizing the enjoyment of the passenger using the present loudspeaker system. The progressive compression system achieves this goal by monitoring ambient sound, the signals being transmitted to the loudspeaker system, the sound volume desired by the passenger, the known effect different altitudes have upon the propagation and instigation of sound, as well as other factors to optimize the sound signal ultimately employed by the loudspeaker system in such a manner that it provides the passenger with high quality sound without disturbing passengers who might be sitting adjacent thereto.

More particularly, the progressive compression system includes a digital audio input for receiving the complete sound signal from an audio source. The complete sound signal is input to a sound processor which first analyzes the components of the complete sound signal, the volume desired by the passenger and the ambient sound within the aircraft. From this information, the sound processor employs an algorithm for sound compression and alteration which determines optimal sound characteristics for both the passenger and those sitting adjacent to the passenger. The optimal sound characteristics are implemented by a digital signal processor which acts upon the complete sound signal to create an attenuated sound signal. The attenuated sound signal is ultimately transmitted to the low frequency, mid-range and high frequency drivers, of the present loudspeaker system via audio wires (not shown) for the creation of a sound field to be enjoyed by the passenger employing the present loudspeaker system without unduly disturbing those sitting in the vicinity of the passenger. In accordance with a preferred embodiment of the present invention, the low end of the frequency range will only be approximately 80 to 90 Hz allowing for the implementation of a low frequency driver system of desirable size and weight characteristics.

In addition to the speaker assembly, the present loudspeaker system 10 is provided with a positioning system 70 allowing for adjustments based upon the size and position of the passenger within the seat 100. In particular, the specific location to which sound is transmitted in accordance with the present invention is achieved through the provision of the positioning system 70 briefly mentioned above. The positioning system 70 includes a user interface 72 in the form of a graphical user interface allowing a user to input his or her position within the seat 100. The graphical user interface 72 allows a passenger to input a variety of parameters including the incline of the seat 100 relative to the passenger, the size of the passenger and the angular orientation of the passenger relative to both the seat back 108 and the seat bottom 106.

Once the position information is input by the user, the first and second loudspeaker driver assemblies 40, 42 are activated to move the first and second support arms 28, 30, to specific locations for optimizing the sound performance of the present system.

The positioning system, and the quality of the sound produced in accordance with the present invention is further enhanced by the provision of a head orientation system. The head orientation system monitors the position of the passenger seated in the seat so that optimal sound reproduction is achieved regardless of the passenger's head position.

The head orientation system uses infrared sensor to determine the position of the head of the passenger based upon the heat signature of the ears of the passenger. Based upon the calculated position of the passenger's head, the transmitted sound is adjusted so as to provide the passenger with the optimal sound.

By providing a directional sound assembly 12 which directly transmits sound to the passenger sitting on a seat 100 and a nondirectional sound assembly 14 that is directly secured to the aircraft seat 100 for transmission of low frequency sound to a passenger sitting on the aircraft seat 100, the present loudspeaker system 10 focuses sound directly upon the passenger sitting on the aircraft seat 100. It is further appreciated the array of drivers used in accordance with the present invention allows for implementation of highly specific digital processing features allowing for highly specific placement of sounds within a 3-dimensional space. For example, the present system is well suited for DOLBY ATMOS™. As those skilled in the art will appreciate, DOLBY ATMOS™ is a surround sound technology allowing for optimal dynamic sound rendering by combining many sound tracks with spatial audio descriptive data (for example, location or pan data).

As the present loudspeaker system may be installed into aircraft that have truly VIP/VVIP seat configurations with multiple monitors located on the bulkheads or in credenzas which can be located inboard/outboard, or even in the middle or offset to the centerline of the aircraft, the loudspeaker system of the present invention may be capable of selecting (either manually or automatically) the monitor with which to sync the media source.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A loudspeaker system for integration with a seat including a seat body having a horizontally oriented seat bottom and a seat back secured thereto, the seat back includes an upper end and a lower end, the lower end is positioned adjacent the seat bottom, comprising:
a sound assembly shaped and dimensioned for mounting with the seat for selective movement between a stowed orientation in which the sound assembly is housed and hidden within a support housing mounted along the seat and a deployed orientation extending from the support housing in which the sound assembly is positioned for use, the support housing includes a first end and a second end;
the sound assembly includes a first support arm and a second support arm, the first support arm is telescopically housed within the support housing and telescopically extends from the first end of the support housing, and the first support arm supports a first loudspeaker driver assembly, and the second support arm is telescopically housed within the support housing and telescopically extends from the second end of the support housing, and the second support arm supports a second loudspeaker driver assembly;
the first loudspeaker driver assembly includes a central housing with a first array of drivers, and the second loudspeaker driver assembly includes a central housing with a second array of drivers; and
a retraction control mechanism that moves the first support arm and the second support arm between the stowed orientation and the deployed orientation.

2. The loudspeaker system according to claim 1, wherein the first array of drivers includes a plurality of drivers selectively extending from the central housing of the first loudspeaker assembly, and the second array of drivers includes a plurality of drivers selectively extending from the central housing of the second loudspeaker assembly.

3. The loudspeaker system according to claim 2, wherein the first array of drivers further includes a driver positioned along a front wall of the central housing of the first loudspeaker driver assembly, and the second array of drivers includes a driver positioned along a front wall of the central housing of the second loudspeaker driver assembly.

4. The loudspeaker system according to claim 2, wherein the central housing of the first loudspeaker driver assembly includes a front wall, a rear wall and a side wall extending between the rear wall and the front wall, driver support members being secured to the central housing in a spaced arrangement, wherein the plurality of drivers of the first loudspeaker driver assembly is respectively secured to the driver support members.

5. The loudspeaker system according to claim 4, wherein the central housing of the second loudspeaker driver assembly includes a front wall, a rear wall and a side wall extending between the rear wall and the front wall, driver support members being secured to the central housing in a spaced arrangement, wherein the plurality of drivers of the second loudspeaker driver assembly is respectively secured to the driver support members.

6. The loudspeaker system according to claim 5, wherein each of the driver support members of the first and second loudspeaker driver assemblies is provided with a servomotor for controlling selective extension of the driver support members.

7. The loudspeaker system according to claim 1, wherein the first support arm is hollow and the second support arm is hollow.

8. The loudspeaker system according to claim 1, wherein the first support arm is L-shaped to wrap about one side of a passenger sitting on the seat and the second support arm is L-shaped shaped to wrap about an opposite side of a passenger sitting on the seat.

9. The loudspeaker system according to claim 8, wherein the first array of drivers includes a plurality of drivers selectively extending from the central housing of the first loudspeaker assembly, and the second array of drivers includes a plurality of drivers selectively extending from the central housing of the second loudspeaker assembly.

10. The loudspeaker system according to claim 9, wherein the central housing of the first loudspeaker driver assembly includes a front wall, a rear wall and a side wall extending between the rear wall and the front wall, driver support members being secured to the central housing in a spaced arrangement, wherein the plurality of drivers of the first loudspeaker driver assembly is respectively secured to the driver support members.

11. The loudspeaker system according to claim 10, wherein the central housing of the second loudspeaker driver assembly has a disc shaped construction and includes a front wall, a rear wall and a side wall extending between the rear wall and the front wall, driver support members being secured to the central housing in a spaced arrangement, wherein the plurality of drivers of the second loudspeaker driver assembly is respectively secured to the driver support members.

12. The loudspeaker system according to claim 11, wherein each of the driver support members of the first and second loudspeaker driver assemblies is provided with a servo-motor for controlling selectively extension.

13. The loudspeaker system according to claim 1, further including a nondirectional sound assembly.

14. The loudspeaker system according to claim 13, wherein the nondirectional sound assembly includes a first low frequency driver positioned within the first support arm and a second low frequency driver positioned within the second support arm.

15. The loudspeaker system according to claim 14, wherein the first support arm is hollow and the second support arm is hollow.

16. The loudspeaker system according to claim 15, wherein the first support arm is L-shaped to wrap about one side of a passenger sitting on the seat and the second support arm is L-shaped shaped to wrap about an opposite side of a passenger sitting on the seat.

17. The loudspeaker system according to claim 16, wherein the first array of drivers includes a plurality of drivers selectively extending from the central housing of the first loudspeaker assembly, and the second array of drivers includes a plurality of drivers selectively extending from the central housing of the second loudspeaker assembly.

18. The loudspeaker system according to claim 17, wherein the central housing of the first loudspeaker driver assembly includes a front wall, a rear wall and a side wall extending between the rear wall and the front wall, driver support members being secured to the central housing in a spaced arrangement, wherein the plurality of drivers of the first loudspeaker driver assembly is respectively secured to the driver support members.

19. The loudspeaker system according to claim 18, wherein the central housing of the second loudspeaker driver assembly has a disc shaped construction and includes a front wall, a rear wall and a side wall extending between the rear wall and the front wall, driver support members being secured to the central housing in a spaced arrangement, wherein the plurality of drivers of the second loudspeaker driver assembly is respectively secured to the driver support members.

20. The loudspeaker system according to claim 19, wherein each of the driver support members of the first and second loudspeaker driver assemblies is provided with a servo-motor for controlling selectively extension.

* * * * *